(12) United States Patent
Shteinfeld et al.

(10) Patent No.: US 9,477,220 B2
(45) Date of Patent: Oct. 25, 2016

(54) CONVEYOR JAM DETECTION SYSTEM AND METHOD

(71) Applicant: Sick, Inc., Bloomington, MN (US)

(72) Inventors: Alexander Shteinfeld, Newton, MA (US); Richard Lydon, Hanover, MA (US)

(73) Assignee: Sick, Inc., Bloomington, MN (US)

( * ) Notice: Subject to any disclaimer, the term of this patent is extended or adjusted under 35 U.S.C. 154(b) by 0 days.

(21) Appl. No.: 14/702,131

(22) Filed: May 1, 2015

(65) Prior Publication Data

US 2015/0329296 A1 Nov. 19, 2015

Related U.S. Application Data

(60) Provisional application No. 61/992,279, filed on May 13, 2014.

(51) Int. Cl.
*B65G 43/00* (2006.01)
*G05B 19/418* (2006.01)
*B65G 43/08* (2006.01)
*G05B 19/042* (2006.01)

(52) U.S. Cl.
CPC ............ *G05B 19/4189* (2013.01); *B65G 43/08* (2013.01); *G05B 19/0428* (2013.01); *G05B 2219/31272* (2013.01); *Y02P 90/28* (2015.11)

(58) Field of Classification Search
CPC B65G 43/00; B65G 43/08; B65G 2203/042; B65G 2203/044; B65H 7/06; B65H 2511/22; B65H 43/00
USPC ........................................... 198/502.1, 502.3
See application file for complete search history.

(56) References Cited

U.S. PATENT DOCUMENTS

| | | | | |
|---|---|---|---|---|
| 3,150,873 A | * | 9/1964 | MacGregor | G06K 13/06 271/259 |
| 3,558,862 A | * | 1/1971 | McMillan | G06K 7/0163 73/157 |
| 3,778,629 A | * | 12/1973 | Terryn | G06K 13/06 250/557 |
| 3,779,440 A | * | 12/1973 | Casale | B41J 29/48 226/100 |
| 3,987,429 A | | 10/1976 | Manduley et al. | |
| 4,173,276 A | * | 11/1979 | Raudat | B65G 43/08 198/437 |
| 4,258,250 A | | 3/1981 | Schmidt | |
| 5,041,850 A | * | 8/1991 | Kahoyashi | B41J 11/703 347/157 |
| 8,630,537 B2 | | 1/2014 | Kadaba | |
| 2006/0144899 A1 | * | 7/2006 | Hu | H01L 21/67138 228/4.5 |
| 2014/0247347 A1 | * | 9/2014 | McNeill | H04N 7/18 348/143 |

FOREIGN PATENT DOCUMENTS

WO WO 2007/084606 A2 7/2007

* cited by examiner

*Primary Examiner* — James R Bidwell
(74) *Attorney, Agent, or Firm* — Iandiorio Teska & Coleman, LLP (57) ABSTRACT

A conveyor jam detection system and method includes a distance detector located on one side of a conveyor oriented to detect the distance from the detector to parcels on the conveyor. A controller is responsive to the distance detector and is configured to compare distance measurements, to reset a jam count if different distance measurements over time are greater than a threshold, to increment the jam count if different distance measurements over time are less than the threshold, and output a jam condition signal if the jam count exceeds a set limit.

5 Claims, 7 Drawing Sheets

CONVEYOR JAM DETECTION SYSTEM AND METHOD

RELATED APPLICATIONS

This application claims benefit of and priority to U.S. Provisional Application Ser. No. 61/992,279 filed May 13, 2014 under 35 U.S.C. §§119, 120, 363, 365, and 37 C.F.R. §1.55 and §1.78 which is incorporated herein by this reference.

FIELD OF THE INVENTION

The subject invention relates to parcel processing conveyor systems.

BACKGROUND OF THE INVENTION

Modern parcel processing subsystems (e.g., FedEx, USPS, UPS, and the like) involve fairly large conveyors with high capacity and high throughput (e.g., four meters per second conveyor velocity).

Jams can occur on the conveyor between the side rails thereof, at corners or along curves, and/or where there are gaps in the side rails.

Prior photo-optic jam detection systems typically had an emitter on one side of the conveyor and a detector on the other side of the conveyor. With numerous adjacent articles on wide conveyors, false positive jam signals are the result.

U.S. Pat. Nos. 3,987,429; 4,258,250; and 8,630,537 are incorporated herein by this reference.

BRIEF SUMMARY OF THE INVENTION

Featured in one preferred example is a new and more reliable conveyor jam detection system. When a jam condition occurs, any one parcel on the conveyor typically doesn't move very much and thus, if, at a set location, the distance from that location to the parcel is measured over time and the distance does not change appreciably, that information can more reliably be used to indicate a jam condition. Featured is a conveyor jam detection system adapted, in one example, to a parcel processing subsystem. A detector is located on one side of a conveyor. In a jam condition, the detector measures the distance to a now stationary parcel and outputs a constant distance measurement signal. In a non-jam condition, the detector measures the distance to a first moving parcel and then over time measures the distance to a second moving parcel which is at a different distance from the detector than the first moving parcel. The detector output then is a varying distance measurement signal over time. A controller (which may be a processor of the distance detector) receives the signals from the detector and is configured to determine if a jam condition exists based on the constant distance measurement signal and to determine if a non jam condition exists based on the varying distance measurement signal. In one example, the controller is configured to determine if a jam condition exists by incrementing a jam count when a constant distance measurement signal is received from the detector and to output a jam condition signal if the jam count exceeds a set limit. The controller is preferably configured to determine if a non jam condition exists by resetting the jam count when a varying distance measurement signal is received and then the jam condition signal is not output by the controller. The system controller may further be configured to determine if a jam condition exists by determining if the conveyor is moving and then outputting a jam condition signal only if the conveyor is moving and the jam count exceeds the set limit.

Also featured is a conveyor jam detection method comprising measuring the distance to a stationary parcel and outputting a constant distance measurement signal, measuring the distance to a first moving parcel and measuring the distance to a second moving parcel at a different distance than a first moving parcel and, in response, outputting a varying distance measurement signal, determining if a jam condition exists based on the constant distance measurement signal, and determining if a non-jam condition exists based on the varying distance measurement signal. Determining if a jam condition exists may include incrementing a jam count when a constant distance measurement signal is received. A jam condition signal is output if the jam count exceeds a set limit. The jam count may be reset in response to a varying distance measurement signal.

Also featured is a conveyor jam detection system including a distance detector located on one side of a conveyor oriented to detect the distance from the detector to parcels on the conveyor. A controller is responsive to the distance detector and is configured to compare distance measurements, to reset a jam count if different distance measurements are greater than a threshold, to increment the jam count if different distance measurements are less than the threshold, and output a jam condition signal if the jam count exceeds a set limit. The system may further include means for detecting whether the conveyor is moving. The controller is then preferably responsive to the means for detecting when the conveyor is moving and is further configured to output a jam condition signal only if the jam count exceeds the set limit and the conveyor is moving.

A conveyor jam detection method includes measuring the distance of parcels on a conveyor from a set location, detecting whether the conveyor is moving, and detecting a jam condition based on whether the conveyor is moving and any changes of measured distances of a parcel over time.

The subject invention, however, in other embodiments, need not achieve all these objectives and the claims hereof should not be limited to structures or methods capable of achieving these objectives.

BRIEF DESCRIPTION OF THE FIGURES

Other objects, features, and advantages will occur to those skilled in the art from the following description of a preferred embodiment and the accompanying drawings, in which:

FIG. 15 is a flow chart depicting the primary steps associated with downstream processing of a jam signal output by the system of the invention in order to determine whether a jam condition exists based on conveyor speed and the like;

DETAILED DESCRIPTION OF THE INVENTION

Aside from the preferred embodiment or embodiments disclosed below, this invention is capable of other embodiments and of being practiced or being carried out in various ways. Thus, it is to be understood that the invention is not limited in its application to the details of construction and the arrangements of components set forth in the following description or illustrated in the drawings. If only one embodiment is described herein, the claims hereof are not to be limited to that embodiment. Moreover, the claims hereof are not to be read restrictively unless there is clear and convincing evidence manifesting a certain exclusion, restriction, or disclaimer.

Figure 1:
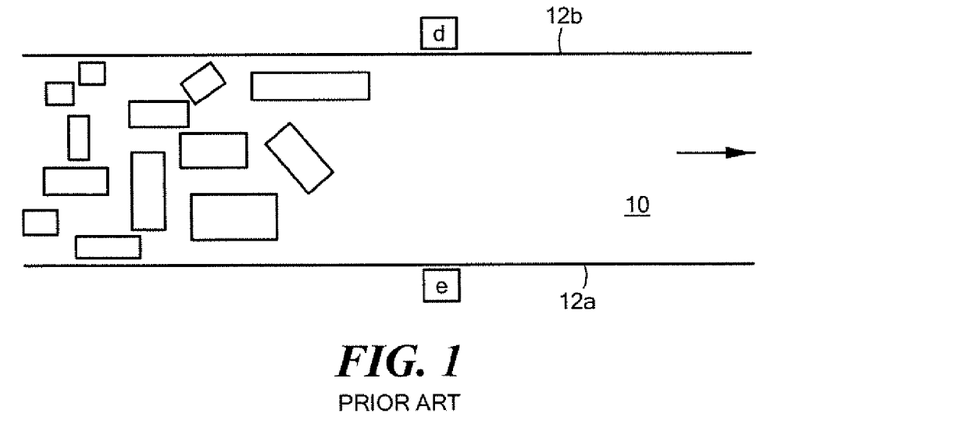
FIG. 1 is a schematic top view of a prior art jam detection system.
Figure 2:
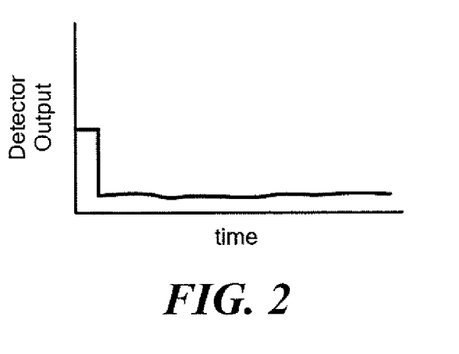
FIG. 2 is a graph showing the output of the detector of the system of FIG. 1 over time indicating a jam condition even though the parcels are not jammed resulting in a false positive situation.

FIG. 1 shows a prior art jam detection system where emitter e is located on one side of the conveyor at a potential jam site (sometimes determined a priori) and a detector d opposite the emitter on the other side of the conveyor. When numerous adjacent parcels as shown are moving on the conveyor belt 10 between side rails 12a and 12b, the detector will be blocked for some time causing the system to determine there is a jam when in fact there is none.

Figure 3:
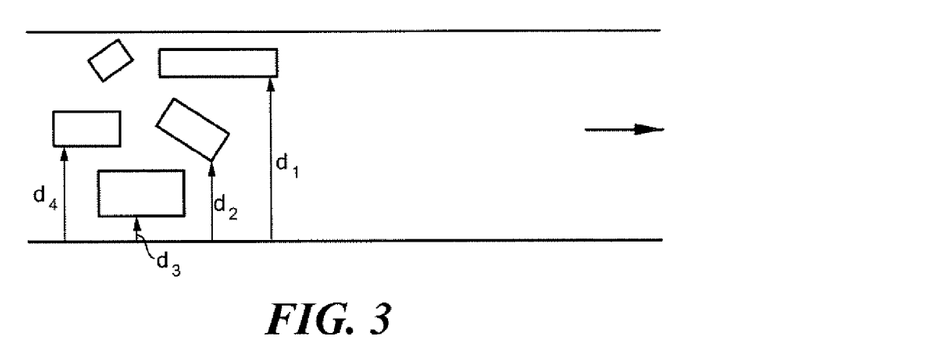
FIG. 3 is a schematic top view showing how a distance measurement device can be used to more reliably detect whether or not a jam condition is occurring.
Figure 4:
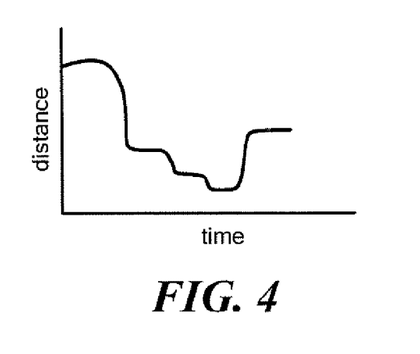
FIG. 4 is a graph showing the distance from a set location to various parcels on the conveyor shown in FIG. 3 over time.

In accordance with examples of the subject invention, a distance measuring sensor is used instead. Thus, the same set of adjacent parcels moving past the distance sensor will yield different distance measurements $d_1$, $d_2$, $d_3$, $d_4$, and the like as shown in FIGS. 3 and 4.

Figure 5:
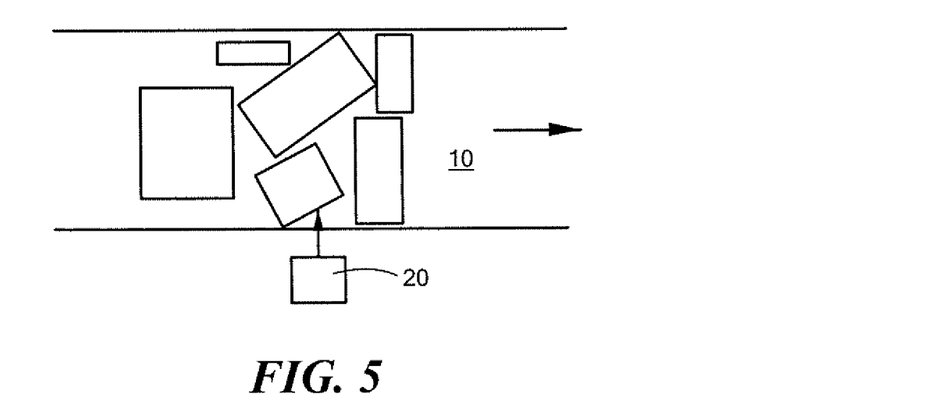
FIG. 5 is a top schematic view showing parcels jammed on a conveyor.
Figure 6:
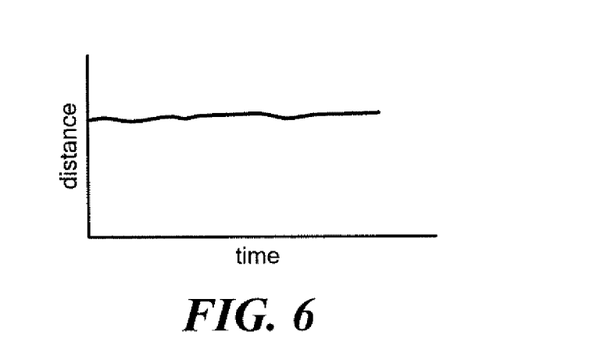
FIG. 6 is a graph of the distance measured by the distance detector shown in FIG. 5 over time.

FIG. 5 show distance detector 20 (e.g., a model DT-10 or DT-35 KED distance detector available from SICK Ag (sick.com)) mounted to emit electromagnetic radiation across conveyor belt 10. FIG. 5 shows a jam condition of the parcels on conveyor belt 10 and FIG. 6 shows how the distance to a parcel as measured by the distance detector does not change appreciably over a given period of time because the parcel is not moving very much in a jam condition. If the conveyor belt is moving as detected by optional encoder 22, FIG. 7 or by some other means, controller 24 is configured (e.g., programmed) to output a jam signal as shown in FIGS. 8-9.

Figure 7:
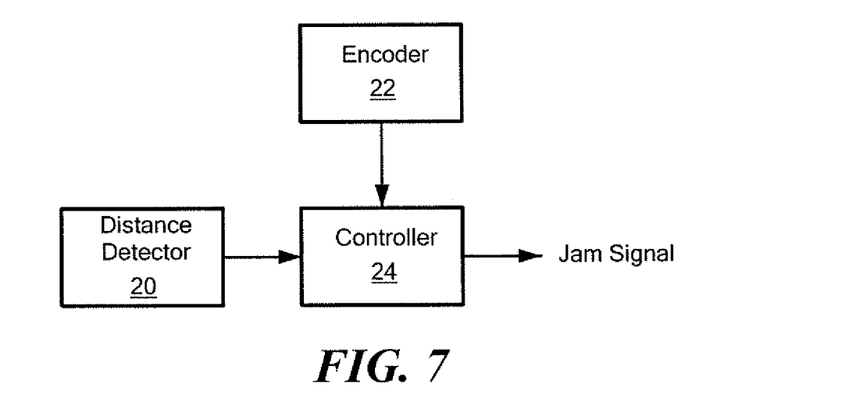
FIG. 7 is a block diagram showing the primary components associated with one preferred embodiment of the subject invention.
Figure 8:
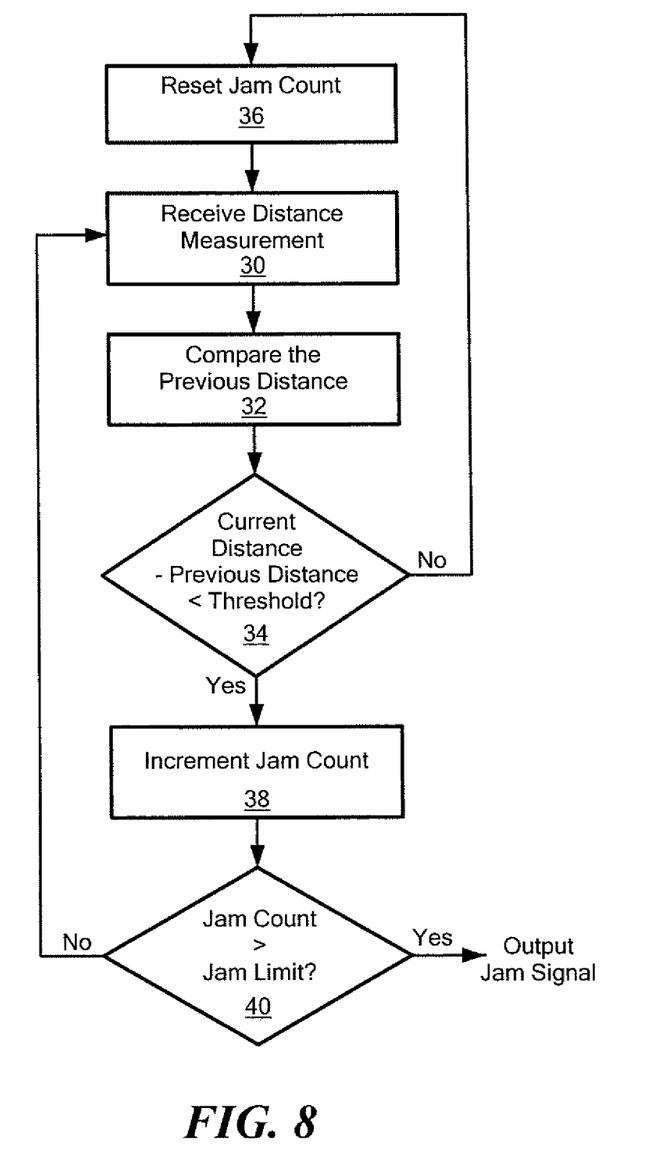
FIG. 8 is a flow chart depicting the primary steps associated with the programming or logic of the controller of FIG. 7 and also depicting the primary steps associated with a method in accordance with the invention.

Controller 24, FIG. 7 (e.g., a microcontroller, PIC controller, microprocessor, field programmable gate array, application specific integrated circuit, microcontroller integrated as a part of the distance sensor, or other logic means or combinations of the same) can include programming or logic which receives a distance measurement, step 30, FIG. 8 from the distance detector and compares that distance from a stored or logged previous distance as measure by the detector, step 32. If in step 34 the most recent distance measurement compared to the second most recent distance measurement is greater than a given threshold (e.g., 50 mm), this indicates a no jam condition (see $d_2$ compared to $d_3$, FIG. 3) and the jam count is reset, step 36. Typically, the jam count is reset to zero. If, however, the most recent distance measurement is less than the threshold, a potential jam condition exists and the jam count is incremented, step 38. When the jam count reaches the jam count limit, step 40, a jam condition signal is output. This signal may trigger an action such as an audible alarm or a "jam condition" indication on a screen or printout. The location of the jam condition may also be displayed based on the location of one or more distance measurement detectors. The jam count limit can be set at the factory or by the user to eliminate false positives and false negatives in a given parcel processing system. A typical setting might be 200. The controller may also provide a signal indicating that a jam condition does not exist limit has not been reached.

Figure 9:
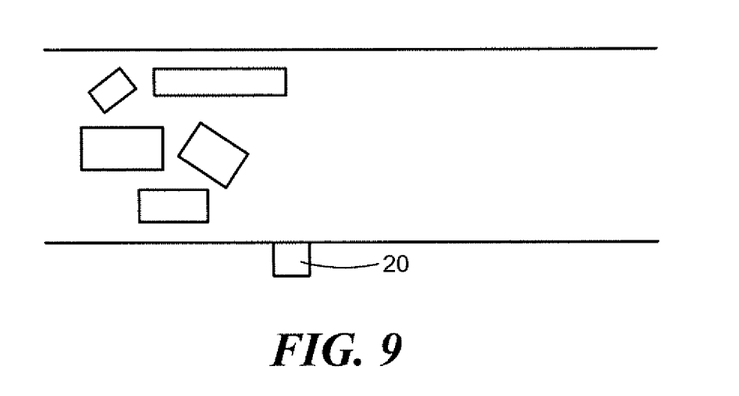
FIG. 9 is a top view of a conveyor showing a non-jam condition.
Figure 10:
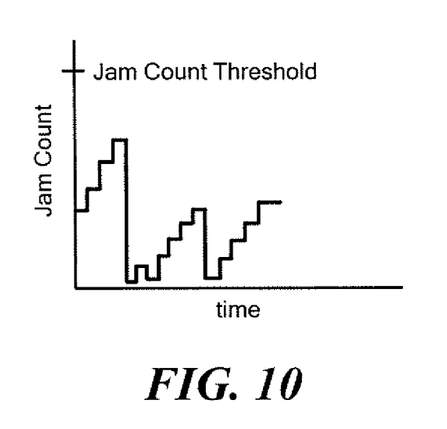
FIG. 10 is a graph showing how the jam count never exceeds the jam count threshold when the method of FIG. 8 is used.
Figure 11:
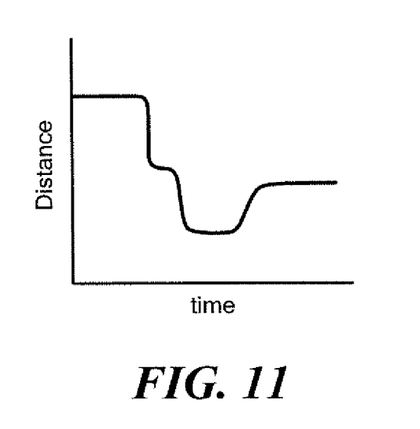
FIG. 11 is a graph showing distance measurements over time for the parcels on the conveyor of FIG. 9.
Figure 12:
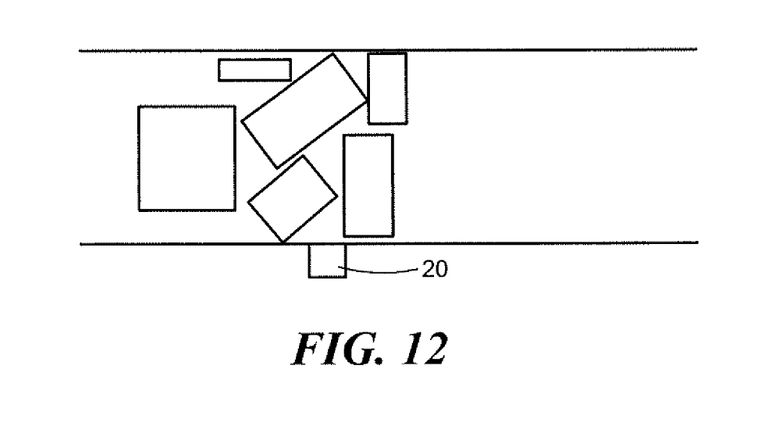
FIG. 12 is a schematic top view showing another jam condition.
Figure 13:
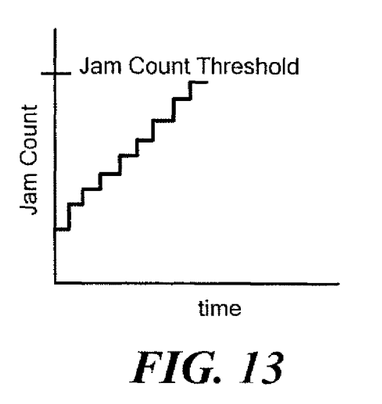
FIG. 13 is a graph showing how the jam count increases over time in the jam situation shown in FIG. 12 and exceeds the jam count threshold.
Figure 14:
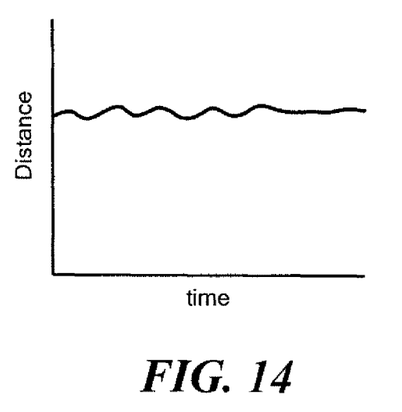
FIG. 14 is a graph showing the output of the distance measurement sensor of FIG. 12.

FIGS. 9-11 show a non-jam condition on the conveyor belt which could have resulted in a false positive jam condition using a prior art optoeleetric system (e.g., as shown in FIG. 1) but here, the jam count never exceeds the jam count threshold and thus false positive jam indications are reduced. FIGS. 12-14 show a jam condition and how the jam count quickly exceeds the jam count threshold or limit in order to output a jam condition signal early in the jamming event so corrective action can be taken.

Figure 15:
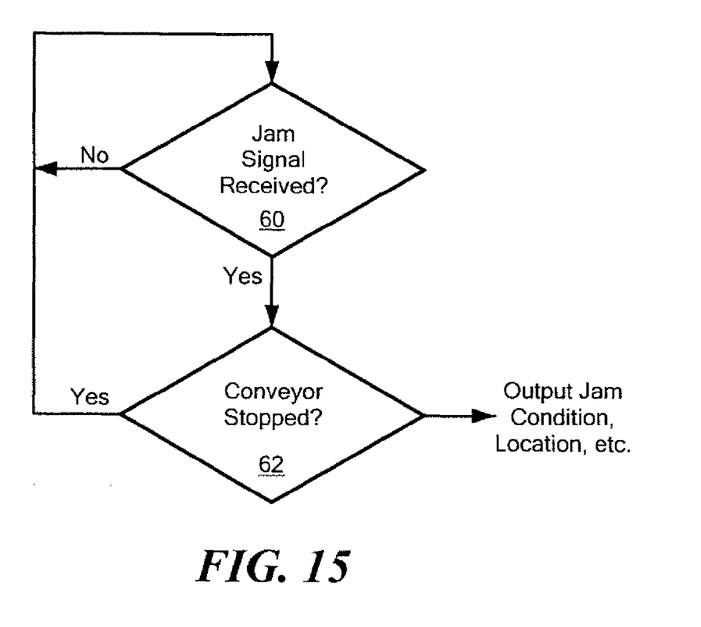

FIG. 15 shows how controller 24, FIG. 7, a system controller, system manager console, a programmable logic controller, or other similar means can use the jam signal in combination with information about the conveyor (see, for example encoder 22, FIG. 7) to process the jam signal, step 60 to provide a jam condition indication only when the jam signal is received and the conveyor is moving, step 62. Other information can be provided by controller 24 such as the jam location and the like. If encoder 22 is not provided, other means providing data can be used to determine whether or not the conveyor is currently moving.

Multiple distance measuring detectors can be used in a facility each disposed at a known problematic or potential jam area at a set location with respect to parcels moving on the conveyor. A controller could be configured to process the signals output by multiple distance sensors.

Figure 16:
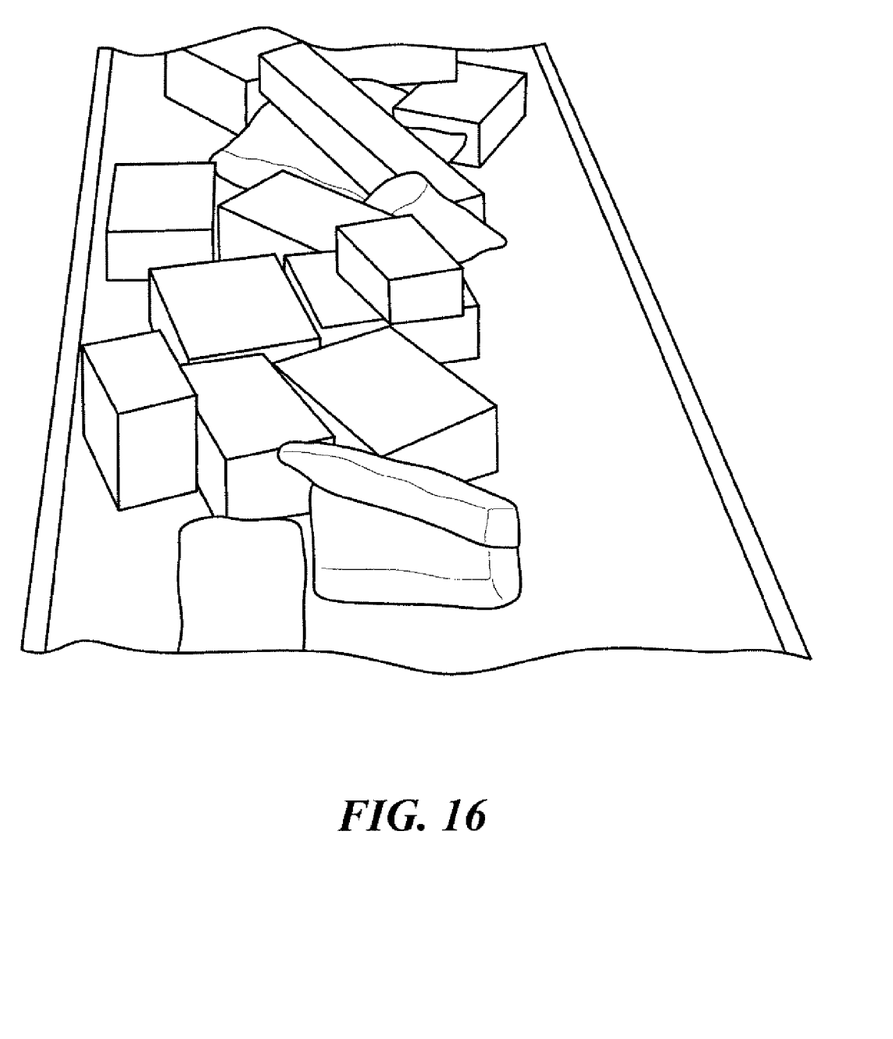
FIG. 16 is a schematic three dimensional top view showing actual parcels on a high throughput, high capacity conveyor.
Figure 17:
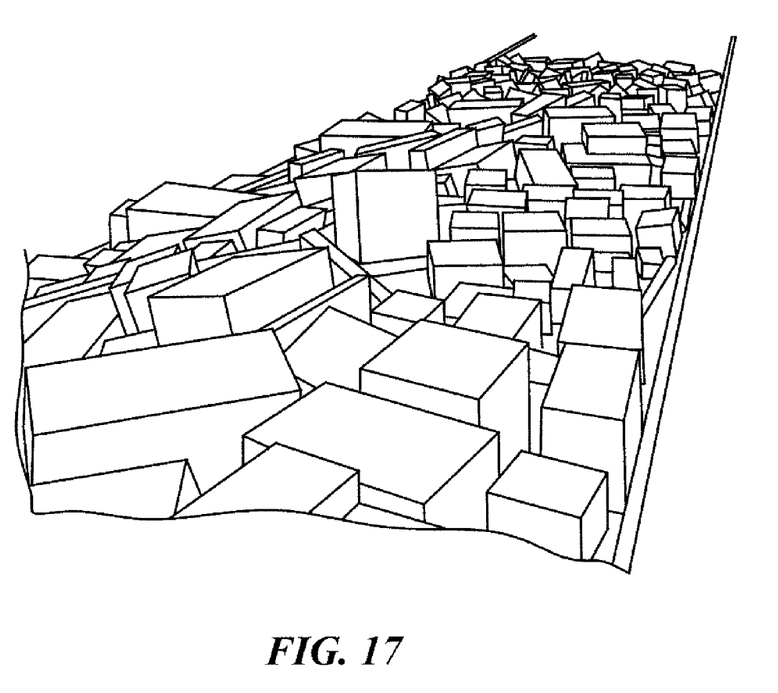
FIG. 17 is a schematic three dimensional top view showing an actual jam condition on a high throughput, high volume parcel conveyor.

The preferred result is a more accurate, easy to install jam detection system. FIG. 16 shows a real non-jam condition and FIG. 17 shows a real jam condition.

The following jam detection algorithm script application parameters capture analog data from the distance sensor and convert the distance to millimeters. For every sample, the algorithm compares it with the previous value. In case the difference is less than a configurable threshold, the application will assume a potential jam and will increment a corresponding counter. In case the difference is greater than a threshold, the counter will be resent back to zero. If the counter becomes greater than a configurable maximum, a jam is detected. The application parameters are:

recordResults=false—Set to true if you want to save encoder and distance measurements for later playback.
playBack=true—Set to true to playback from the log file.
logFilename="recordJam3times.txt"—File name for log results and playback
debugLevel=true—For Debugging
hardwareTest=false—Set to true to see the encoder ticks and the distance values on the screen
conveyorFixedSpeed=true—Enable/Disable fixed conveyor speed mode
jamDetectLength=5000—Total distance (in mm of conveyor travel) used to calculate a jam
maxJamDistanceDiff=50—Maximum difference between the samples (in mm) for jam detection Although specific features of the invention are shown in some drawings and not in others, this is for convenience only as each feature may be combined with any or all of the other features in accordance with the invention. The words "including", "comprising", "having", and "with" as used herein are to be interpreted broadly and comprehensively and are not limited to any physical interconnection. Moreover, any embodiments disclosed in the subject application are not to be taken as the only possible embodiments. Other embodiments will occur to those skilled in the art and are within the following claims.

In addition, any amendment presented during the prosecution of the patent application for this patent is not a disclaimer of any claim element presented in the application as filed: those skilled in the art cannot reasonably be expected to draft a claim that would literally encompass all possible equivalents, many equivalents will be unforeseeable at the time of the amendment and are beyond a fair interpretation of what is to be surrendered (if anything), the rationale underlying the amendment may bear no more than a tangential relation to many equivalents, and/or there are many other reasons the applicant cannot be expected to describe certain insubstantial substitutes for any claim element amended.

What is claimed is:

1. A conveyor jam detection system comprising:
a distance detector located on one side of a conveyor oriented to measure the distance from the detector to parcels on the conveyor;
a controller responsive to the distance detector and configured:
to compare distance measurements,
to reset a jam count if distance measurements differ greater than a threshold,
to increment the jam count if distance measurements differ less than the threshold, and
output a jam condition signal if the jam count exceeds a set limit.

2. The system of claim 1 further including means for detecting whether the conveyor is moving.

3. The system of claim 1 or 2 in which the controller is responsive to the means for detecting when the conveyor is moving and is further configured to output a jam condition signal if the jam count exceeds the set limit and the conveyor is moving.

4. A conveyor jam detection method comprising:
measuring the distance to parcels on a conveyor and outputting a distance measurement signal;
comparing distance measurement signals;
calculating differences in consecutive distance measurements;
resetting a jam count if the difference is greater than a threshold;
incrementing the jam count if the difference is less than the threshold; and
outputting a jam condition signal if the jam count exceeds a set limit.

5. The method of claim 4 in which determining if a jam condition exists includes determining if the conveyor is moving and outputting a jam condition signal only if the conveyor is moving and the jam count exceeds the set limit.

* * * * *